United States Patent [19]
Stease

[11] 3,944,037
[45] Mar. 16, 1976

[54] RAIL STRUCTURE FOR A CONVEYOR

[76] Inventor: Ralph E. Stease, 8921 Cavalier Drive, Cincinnati, Ohio 45231

[22] Filed: July 5, 1974

[21] Appl. No.: 485,932

Related U.S. Application Data

[62] Division of Ser. No. 381,788, July 23, 1973, Pat. No. 3,876,060.

[52] U.S. Cl............ 193/35 TE; 193/35 F; 198/109
[51] Int. Cl.²........................................ B65G 13/00
[58] Field of Search........ 198/109, 127 R, 139, 189; 193/35 R, 35 TE, 35 F; 248/49, 51, 52; 52/108, 111, 7; 74/245 R, 245 C, 245 LP, 250 R, 250 C

[56] References Cited
UNITED STATES PATENTS

| | | | |
|---|---|---|---|
| 2,324,033 | 7/1943 | Simmons | 74/250 R |
| 2,374,267 | 4/1945 | Berg et al. | 198/189 |
| 2,793,736 | 5/1957 | Thomson | 198/127 R |
| 3,118,317 | 1/1964 | Michalik | 74/250 R |

*Primary Examiner*—Evon C. Blunk
*Assistant Examiner*—Joseph E. Valenza
*Attorney, Agent, or Firm*—Wood, Herron & Evans

[57] ABSTRACT

A link type rail structure for a conveyor device where the rail structure is adapted to be moved between a rigid, straight line attitude which can support weighted objects thereon, and a curved line attitude which permits the rail structure to be coiled up for storage. The rail structure is characterized by element structure and function that substantially eliminates pinch points between successive connecting and supporting links of the rail structure.

7 Claims, 8 Drawing Figures

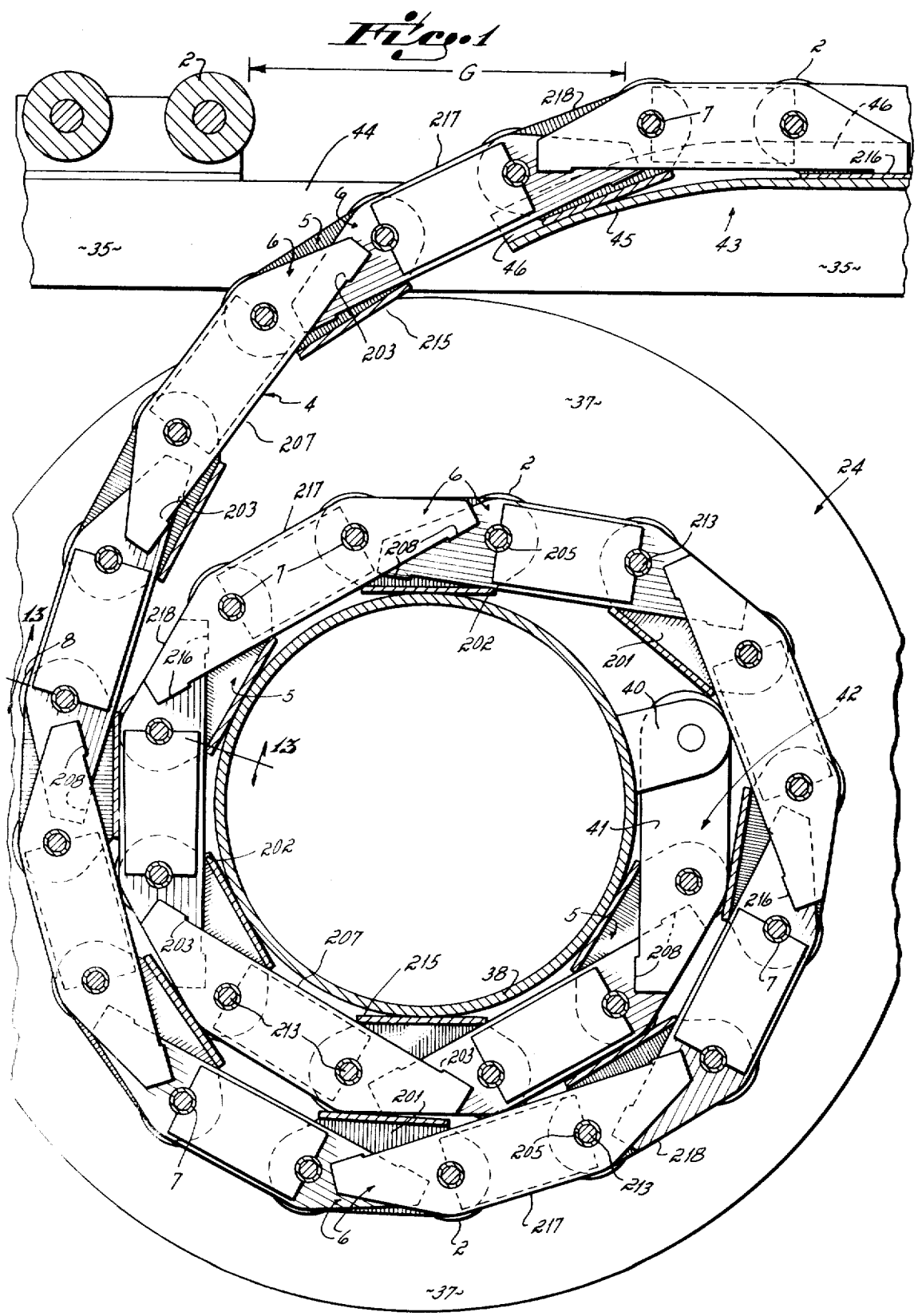

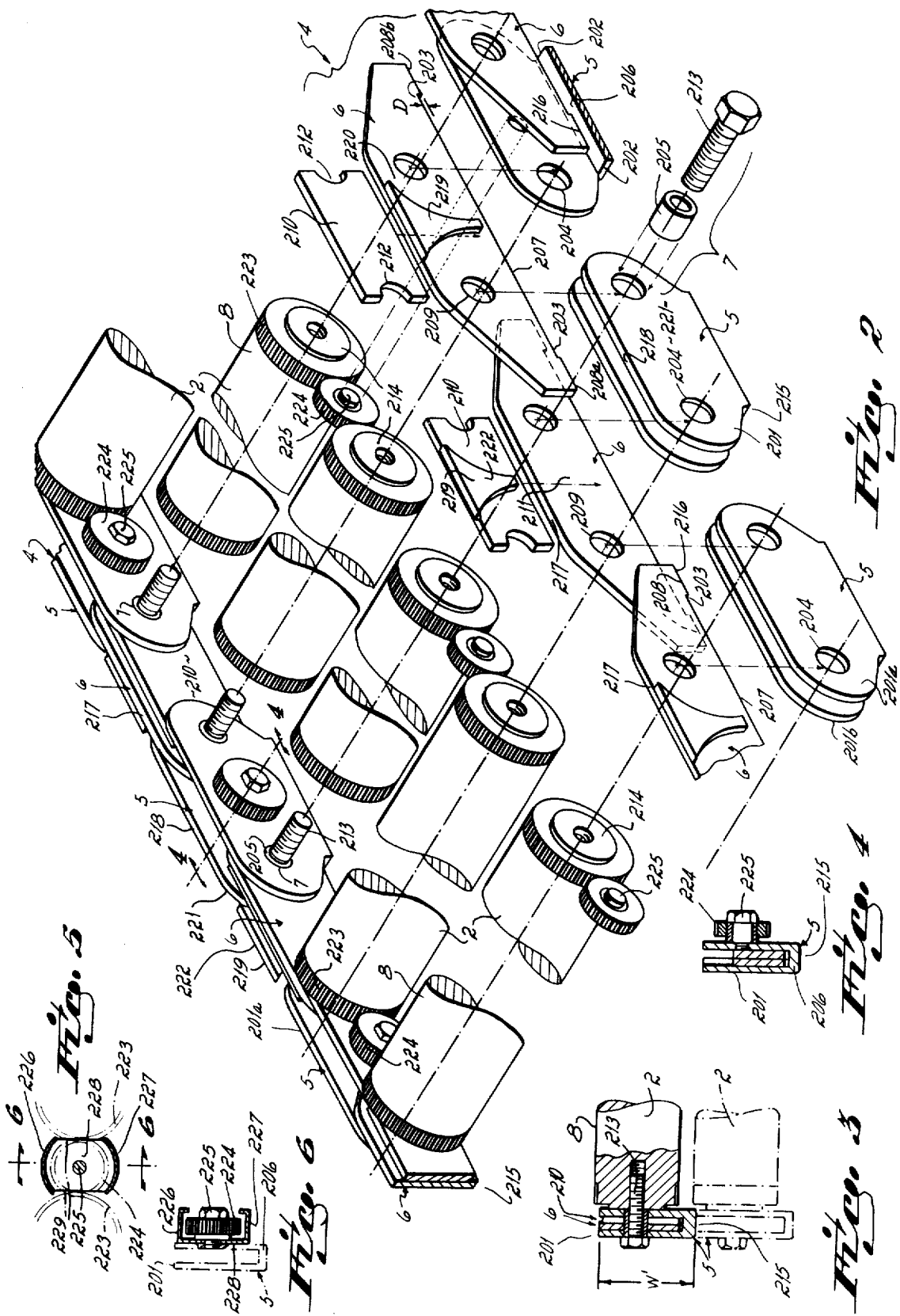

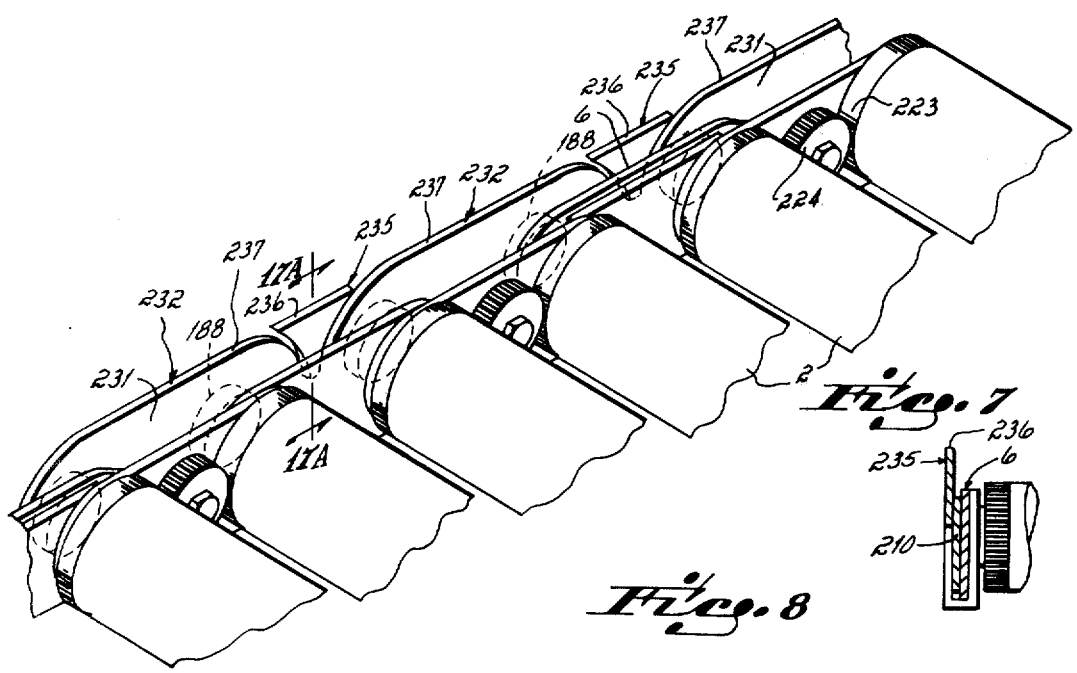

RAIL STRUCTURE FOR A CONVEYOR

This application is a divisional of U.S. Application Ser. No. 381,788, filed July 23, 1973 entitled ROLL-UP CONVEYOR UNIT. That earlier application issued as U.S. Letters Pat. No. 3,867,060 on APR. 8, 1975.

This invention relates to conveyors. More particularly, this invention relates to a novel roll-up conveyor unit.

There are two basic types of so-called gravity conveyors. One is a skate wheel type conveyor and the other is a roller type conveyor. The skate wheel type conveyor basically incorporates a multiplicity of individual wheels mounted between fixed side rails, a number (e.g., three or four or more) of such wheels being disposed between the side rails on each transverse wheel axis along the conveyor's length. A roller type conveyor includes a plurality of rollers also mounted between fixed side rails, a single roller extending between the side rails on each transverse roller axis. The main difference between a roller type conveyor and a skate wheel type conveyor, therefore, is that a single roller is provided at a specific transverse axis location along the along the conveyor's length whereas multiple skate wheels are provided at a specific transverse axis location along the conveyor's length. The reference to a gravity type conveyor refers to the fact that the skate wheel conveyor or the roller conveyor may be oriented angularly, however slightly, relative to ground level so that boxes or the like disposed on the conveyors will then roll downhill, i.e., from the higher end to the lower end, due to gravity.

Roller type conveyors may also be powered or driven, as opposed to relying solely on gravity for operation, as is well known to the art. Such a power drive roller conveyor incorporates a drive motor with the conveyor itself, the drive motor being engageable with the rollers by some kind of a gearing or drive system that positively drives each of the rollers along the conveyor's length at a controlled rotational rate. This structure allows boxes or the like to be positively moved along a flat portion or an uphill portion of the conveyor's length.

Skate wheel and roller type conveyors are particularly adapted for use in warehousing operations. Such conveyors are provided commercially in lengths of eight feet or ten feet or more, and the lengths are flat or horizontal relative to the conveying plane. The prefabricated conveyor lengths or sections are adapted to hook together into a continuous length conveyor run. The conveyor run may be totally flat or horizontal relative to ground level, or it may have portions thereof that are angularly disposed relative to ground level. However, any angular disposition of one section to another can only occur where that one section is hooked or connected together with that other.

One use of the prefabricated conveyor lengths discussed above is to interconnect various areas of a warehouse one with the other for movement of goods from that one area to the other. A second use is in connection with the loading and unloading of trailers or railroad cars at a warehouse's dock, the conveyor directly connecting the inside area of the warehouse with the inside area of the trailer or railroad car to facilitate loading and/or unloading. When not in use, the multiple conveyor sections are, of course, disassembled from the extended length conveyor run and the sections stacked one upon the other in parallel fashion in a suitable storage area. However, in each instance the erection and disassembly of a continuous length conveyor run must be manually accomplished because of the multiple sections, and this is usually a time consuming and heavy task.

It has been an objective of this invention to provide a rail structure adapted to be moved between a rigid, straight line attitude which can support weighted objects thereon, and a curved line attitude which permits the rail structure to be coiled up for storage, that rail structure being substantially pinch point free between successive connecting and supporting links of the rail structure.

Other objectives and advantages of this invention will be more apparent from the following detailed description taken in conjunction with the drawings in which:

FIG. 1 is an enlarged and more detailed view of the roll-up conveyor unit illustrating, in particular, the conveyor's side rails in rolled or storage attitude in a generally circular spiral configuration;

FIG. 2 is a broken away and exploded perspective view of a section of the roll-up conveyor;

FIG. 3 is a cross-sectional view taken along line 13—13 of FIG. 1;

FIG. 4 is a cross-sectional view taken along line 14—14 of FIG. 2;

FIG. 5 is a side view of an alternative drive train structure between rollers;

FIG. 6 is a cross-sectional view taken along line 16—16 of FIG. 5;

FIG. 7 is a partial perspective view showing an alternative link construction for the conveyor's side rails and;

FIG. 8 is a cross sectional view taken along line 17a—17a of FIG. 7.

A detailed description of a roll-up conveyor unit with which the rail structure of this invention is particularly useful is disclosed in detail in U.S. Pat. No. 3,876,060, issued Apr. 8, 1975, invented by the named inventor herein.

Side Rail Construction

As noted, the conveyor's side rails 4, 180 are of a novel linkage 5, 6 structure that permits breaking of the side rails so the conveyor can be wound up when force is applied in an upward direction and prevents breaking of the side rails (i.e., maintains those side rails in a rigid attitude) when force is applied in a downward direction, see particularly FIGS. 2–5. Each side rail 4 is fabricated of support links 5 and connecting links 6 in alternate combination, each support link having a connecting link pinned at opposite ends.

Each support link 5 is U-shaped in cross-sectional configuration, each connecting link 6 being trapped between the support link's side walls 201 when the connecting link is pinned thereto. More specifically, note that each support link 5 is generally trapezoidal in configuration, the minor parallel side of each support link providing the base 206 of the U-shaped support link. Each pair of parallel side walls 201 define a pinhole 204 at each end of the support link 5, the pinholes being adapted to receive a collar 205 to establish the pinned interconnections with the associated connecting links 6. Note particularly that the base 206 of each U-shaped support link 5 is in the nature of a lip adapted to cooperate with the associated connection links 6 as described in detail below.

Each connecting link 6 is planar or plate-like in configuration. More particularly, each connecting link 6 is also generally trapezoidal in configuration, and the major parallel side 207 defines feet 208a, 208b adapted to pivot into and out of supporting contact with the base of successive support links 5. Each connecting link is provided with a pinhole 209 at each end of the connecting link 6, the pinholes being sized to receive collars 205, too, to establish the pinned interconnections with the associated support links 5.

Each link assembly, which includes a connecting link 6 and a support link 5 in pinned combination, is provided with a spacer plate 210 for lateral rigidity of the side rail 4, 180. The spacer plate 210 is paired with the connecting link 6 in assembly, and is of a generally rectangular figuration sized to conform with the rectangularly configured center portion 211 of the connecting link 6. The spacer plate 210 is provided with notched ends 212 adapted to interfit the collars 205 which cooperate to form the pinned connections of each connecting link 6 with respective support links 5 on each side thereof.

The spacer plate 210/connecting link 6/support link 5 assembly for each side rail 4, 180 is held in assembled relation by bolts 213, the holes 209, 204 in the respective links 5, 6 being sized to accommodate the collar 205 which surrounds each bolt so as to maintain relatively exact tolerances between successive links and to provide a smooth bearing surface about which the links may pivot relative one to the other. The bearings 214 at each end of each roller 22 are fixed to the side rails 4, 180 by these bolts 213, too, thereby rotatably mounting the rollers to the side rails.

Note particularly that, when assembled, the base 206 of the U-shaped support links 5 define the bottom edge 215 of each side rail 4, 180. Note also that the bottom edges 216 of each connecting link's feet 208 are adapted to rest on the adjacent support links' lips or bases 206 when the conveyor 1 is extended; this provides the vertically downward rigidity for the conveyor's side rails 4, 180 when the conveyor is extended in a rigid, in-line use attitude. Note further that the maximum break permitted between each support link 5 and connecting link 6 is that angular or broken line conveyor attitude established where the connecting link's bottom offset edge 203 engages (and is stopped from further pivotal motion by) the transverse end edge 202 of the adjacent support link's lip 206. Thus, each connecting link 6 is adapted to pivot relative to its associated support link 5 between an in-line position (shown in FIG. 2) where edge 216 of foot 208 abuts the support link's lip 206 and an angulated or broken line position (shown in FIG. 1) where offset edge 203 abuts the lip's transverse end edge 202. The depth D of the offset, in effect, controls the length of the pivot arc. Note further that the connecting links 6 are sized so that the top edges 217 thereof are coplanar with the support links' top edges 218 when the side rails 4, 180 are in the extended configuration; this is particularly important as it provides a rail structure of four plate thicknesses in width which is of aid in seating the conveyor in rolled-up configuration when the circular spiral configuration as shown in FIGS. 1 and 3 is used.

Alternate connecting links 6 and spacer plates 210 have a V-shaped pinch-prevent plate 219 welded to the outer surface 220 thereof. These pinch-prevent plates 219, in effect, provide a continuous outer side wall surface 221 comprised of the outermost wall 201a of the support links 5 and the exposed surfaces 222 of the pinch-prevent plates, thereby substantially reducing the potential pinching hazard to an operator's hands as successive links 5, 6 of the side rails are pivoted relative one to the other upon rolling up the conveyor into the storage attitude or extending the conveyor into the use attitude.

The rollers 2, of course, extend between the respective side rails 4, 180 of the conveyor 1. Each roller 2 is provided with a circumferential ring gear 223 at each end thereof. An idler gear 224 is mounted to the inner wall 201b of each support link 5 by bolt 225, the idler gear being meshed with ring gear 223 on the rollers 2 ahead and behind it. Note, as illustrated in FIG. 2, that the idler gears 224 alternate from right to left between succeeding pairs of rollers 2. Note further that the trailing hole of a U-shaped support link 5 on one side rail 4, 180 is connected by a roller 2 with the leading hole of the U-shaped support link on the opposite side rail. This assembly allows simplicity and economy in the manufacture of the side rail links 5, 6 as the same link parts may be used for both side rails. Further, this allows for easier assembly of the structure during production as it eliminates the need for right and left hand parts, as well as the need for maintaining of those parts separate one from the other.

Rotation of the rollers 2 is imparted thereto through drive sprocket 60, all rollers being interconnected with that drive sprocket through the ring gear 223/idler gear 224 structure provided each of the rollers. An important feature of this invention is that the conveyor's power drive unit 58 is operable even when the conveyor 1 is partially rolled up within the conveyor's housing, thereby allowing the rollers 2 to be powered even when the conveyor is only partially extended. In the FIG. 1 configuration, of course, the conveyor's side rails 4 are directly wound in spiral configuration upon themselves about the drum's core 38, the side rails being maintained in their respective planes by opposed walls 37 of the drum 24 to aid in insuring that the structural link 5, 6 configuration maintains the rollers 2 out of contact one with the other as illustrated in FIG. 1. In the generally circular spiral roll-up configuration, where each side rail's links 5, 6 are guided one upon the other there is no orientation where the rollers are closer one to the other than as shown in FIG. 3, and the width W' of the links 5, 6 is sized such that roller 2 to roller contact is not possible in that orientation.

As illustrated in FIG. 4, the idler gears 224 are simply rotatably fixed to the connecting links by bolts 225. An alternative embodiment of the idler gears 224 is illustrated in FIGS. 5 and 6. As shown in those two Figures, an upper 226 and a lower 227 guard are fixed to the connecting link 6 as at 228, the guards being adapted to span between successive conveyor rollers 2 over the idler gear 224. This guard 226, 227 structure aids in reducing the possibility of an operator's fingers becoming caught in the pinch points 229 between an idler gear 224 and its related conveyor roller 2 as those rollers are positively rotated by the conveyor's drive. This pinch point elimination is particularly useful in reducing operating hazards of the conveyor 1 to those personnel charged with its operation.

An alternative embodiment of the side rail's link 5, 6 structure is illustrated in FIG. 7. As shown in this embodiment, the outer wall 231 of each support link 5 is provided with a raised section 232 that extends substantially above the conveying surface of the conveyor's rollers 2. These raised sections 232 provide, in effect, guide rails for the roll-up conveyor to aid in preventing boxes or the like from falling off the conveyor unit during movement thereon.

In this alternative link 5, 6 structure shown in FIGS. 7 and 8, alternate connecting links 6 and spacer plates 210 have a V-shaped pinch-prevent plate 235 welded to the outer surface thereof in much the same general location as shown in FIG. 2 except that the plates 235 are positioned so the top edge 236 of each extends in-line with the top edge 237 of the adjacent support links' wall 231. These pinch-prevent plates 235, in effect, provide a continuous outer side wall surface as well as a continuous upper edge 236, 237 for each side rail. The continuous upper edge 236, 237 insures that boxes (not shown) or the like do not get hung up in the gap that would otherwise be present between successive support links 5.

Having described in detail the preferred embodiments of my invention, what I desire to claim and protect by Letters Patent is:

1. A link type rail structure for a conveyor device, said structure comprising
    a plurality of support links with each of said support links being of a U-shaped cross-sectional configuration, said U-shaped configuration being defined by a pair of opposing vertical side walls and a horizontal lip connected between said side walls along the bottom edges thereof,
    a connecting link interposed between successive support links, opposite ends of each of said connecting links being pivotally connected to an adjacent end of a support link and being positioned between said side walls of that support link, each connecting link providing a foot portion at each end thereof adapted to contact an associated support link's lip to establish said links in a straight in-line attitude and an offset portion at each end thereof adapted to contact a transverse edge of said lip to establish said links in a curved line attitude, and each end of each connecting link beyond the pivotal connection of that link with its adjacent support links being configured such that same is confined between the side walls of said adjacent support links as said rail structure is translated between the rigid in-line attitude and the curved line attitude, thereby aiding in the elimination of pinch points between successive links of said rail structure, and
    means adapted to mount a plurality of one of rollers and skate wheels to said rail structure.

2. A pair of opposed rail structures as set forth in claim 1, said pair being in the form of a roll-up conveyor, and said structure further comprising
    a plurality of one of rollers and skate wheels connected between said opposed rail structures.

3. A rail structure as set forth in claim 2 including
    a pin that pivotally connects a pair of successive support and connecting links together, said pin also serving to mount either a roller or a series of skate wheels to said rail structure.

4. A rail structure as set forth in claim 1 including
    a plurality of spacer plates mounted to cooperate with each of said connecting links, and
    a V-shaped plate on the outer face of said spacer plates and connecting links, said V-shaped plates and outer walls of said U-shaped support links providing a substantially continuous outer face for said rail, thereby also aiding in elimination of pinch points on said flexible rail structure.

5. A rail structure as set forth in claim 1 wherein the top edge of a connecting link and at least one side wall top edge of both adjacent support links are coplanar one with the other when said rail is in the straight in-line attitude.

6. A rail structure as set forth in claim 2, each of said support links including
    a vertical riser section attached to said rail that extends upwardly above the conveying surface of any rollers or skate wheels, thereby providing a guide rail which prevents packages being conveyed over said rails from falling off said roll-up conveyor.

7. A rail structure as set forth in claim 1 including
    a collar provided to establish a smooth bearing surface at said pivotal connection between each connecting link and support link.

* * * * *